US 7,080,967 B2
Jul. 25, 2006

(12) United States Patent
Ackerman et al.

(10) Patent No.: US 7,080,967 B2
(45) Date of Patent: Jul. 25, 2006

(54) NETS

(75) Inventors: David Ackerman, Dorchester (GB); Stephen Mark Trafford, Lyme Regis (GB)

(73) Assignee: Amsafe Bridport Limited, Bridport Dorset (GB)

( * ) Notice: Subject to any disclaimer, the term of this patent is extended or adjusted under 35 U.S.C. 154(b) by 75 days.

(21) Appl. No.: 10/496,406

(22) PCT Filed: Nov. 8, 2002

(86) PCT No.: PCT/GB02/05063

§ 371 (c)(1),
(2), (4) Date: May 22, 2004

(87) PCT Pub. No.: WO03/045779

PCT Pub. Date: Jun. 5, 2003

(65) Prior Publication Data

US 2004/0265089 A1 Dec. 30, 2004

(30) Foreign Application Priority Data

Nov. 23, 2001 (GB) ................... 01281633

(51) Int. Cl.
*B61D 45/00* (2006.01)

(52) U.S. Cl. .................................... 410/118
(58) Field of Classification Search ................ 410/118, 410/121; 182/138, 137, 82; 244/110 C, 244/118.1, 100 C See application file for complete search history.

(56) References Cited

U.S. PATENT DOCUMENTS

| 2,669,402 | A | * | 2/1954 | Del Mar ...................... 410/118 |
| 3,099,313 | A | * | 7/1963 | Peck et al. .................. 410/118 |
| 3,486,723 | A | * | 12/1969 | Harrison ...................... 410/118 |
| RE28,788 | E | * | 4/1976 | Williamson, III ........... 410/118 |
| 3,961,585 | A | * | 6/1976 | Brewer ........................ 410/97 |
| 4,168,667 | A | * | 9/1979 | Loomis ...................... 410/118 |
| 5,458,447 | A | * | 10/1995 | Clason ...................... 410/100 |
| 5,752,459 | A | * | 5/1998 | Rexroad ..................... 112/440 |
| 5,848,864 | A | * | 12/1998 | Selby .......................... 410/97 |
| 5,860,350 | A | * | 1/1999 | Rexroad ......................... 87/6 |
| 5,876,167 | A | | 3/1999 | Selby |
| 5,944,381 | A | * | 8/1999 | Nguyen ...................... 297/281 |
| 6,123,294 | A | | 9/2000 | Genovese |
| 6,244,803 | B1 | | 6/2001 | Parish et al. |
| 6,435,786 | B1 | * | 8/2002 | Breckel et al. ............. 410/118 |
| 6,776,260 | B1 | * | 8/2004 | Cjepa ......................... 182/138 |

FOREIGN PATENT DOCUMENTS

GB 2339802 A 2/2000

OTHER PUBLICATIONS

International Search Report dated Feb. 17, 2003 for corresponding International Application No. PCT/GB02/05063, 4 pgs.
International Preliminary Examination Report dated Jan. 30, 2004 for corresponding International Application No. PCT/GB02/05063, 12 pgs.

* cited by examiner

*Primary Examiner*—H Gutman
(74) *Attorney, Agent, or Firm*—Christie, Parker, & Hale, LLP

(57) ABSTRACT

A net comprising a combination of a plurality of lengths (2, 3) of a first material with a plurality of lengths (11) of a second material having a relatively lower elongation than that of the first material in which at least some of the lengths (2, 3) of first material are transversed to at least some of the lengths (11) of second material.

11 Claims, 4 Drawing Sheets

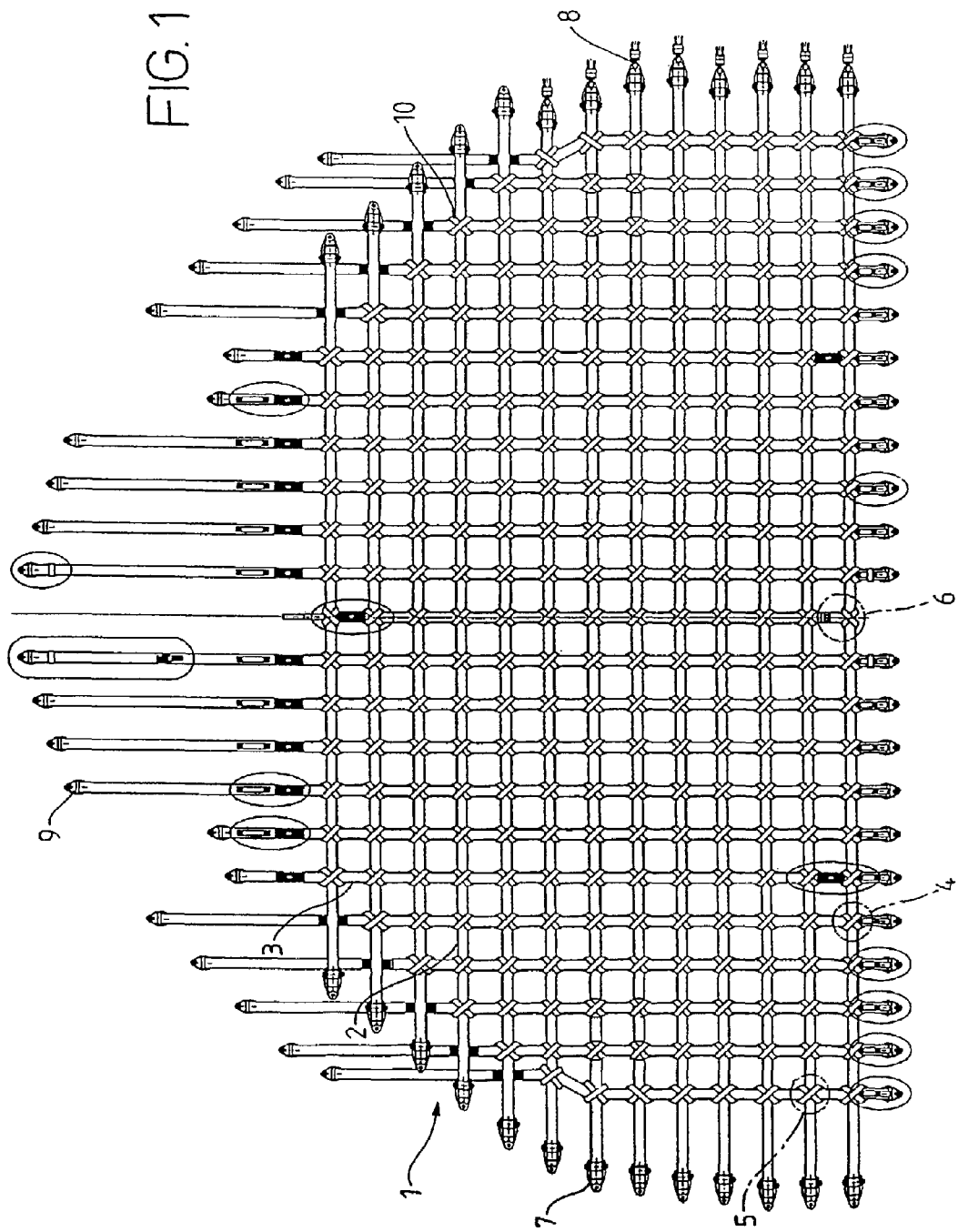

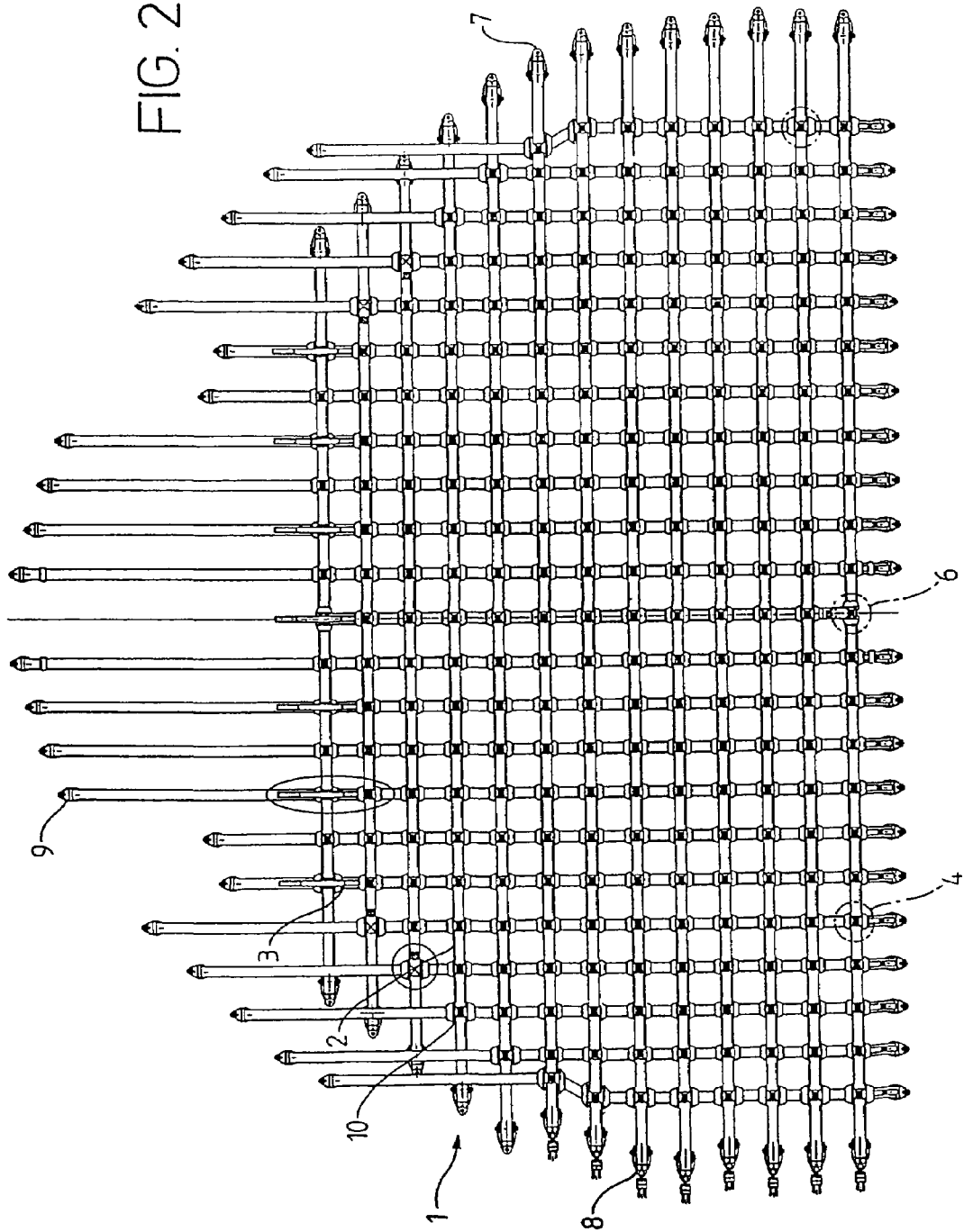

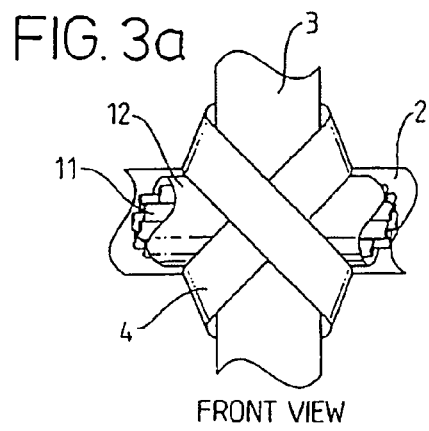
FIG. 3a FRONT VIEW
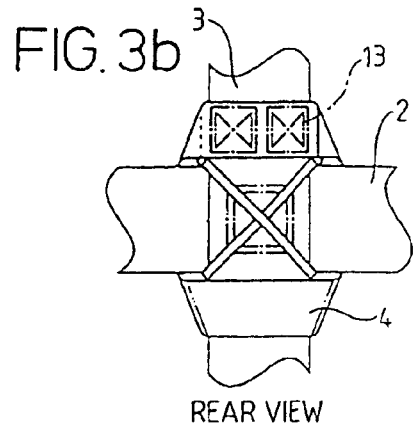
FIG. 3b REAR VIEW
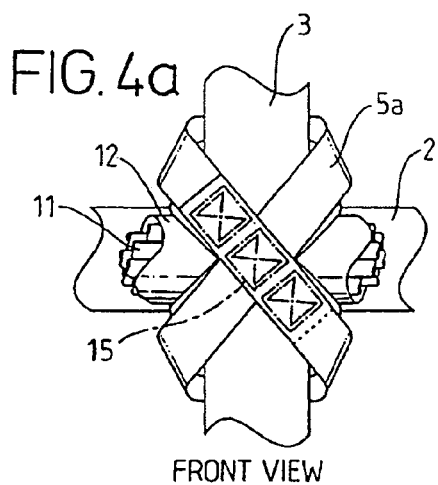
FIG. 4a FRONT VIEW
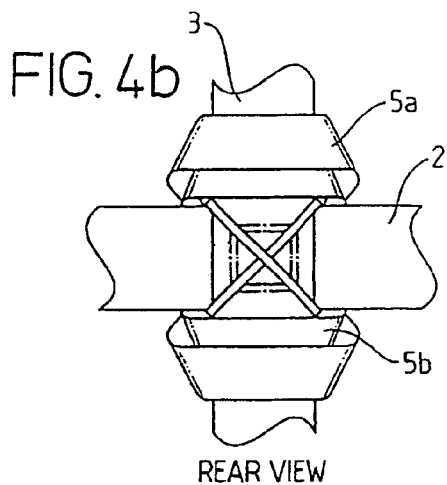
FIG. 4b REAR VIEW
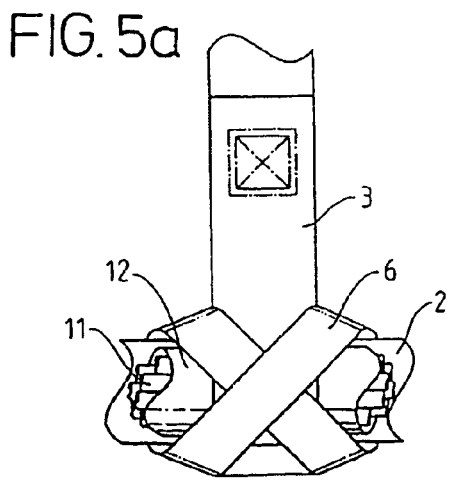
FIG. 5a
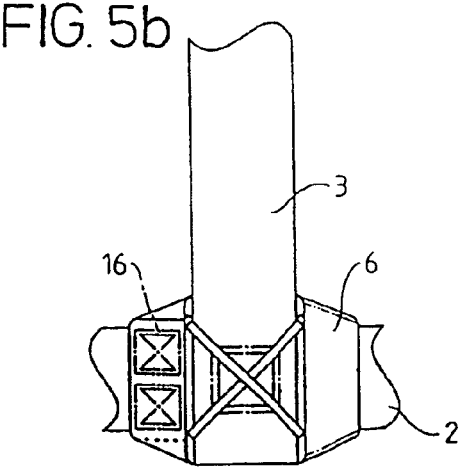
FIG. 5b

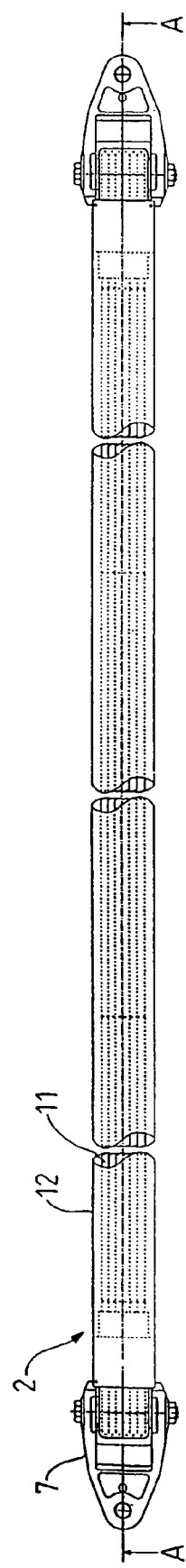
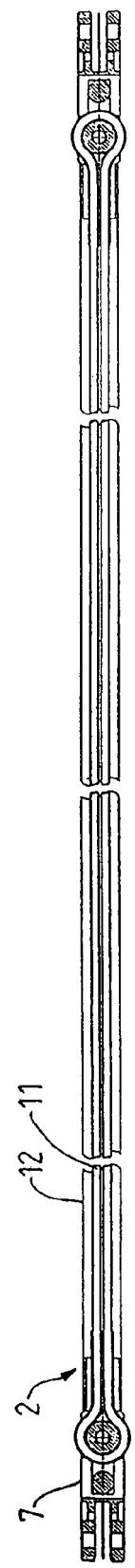

NETS

CROSS-REFERENCE TO RELATED APPLICATION

This application is a National Phase Patent Application of International Application Number PCT/GB02/05063, filed on Nov. 8, 2002, which claims priority of British Patent Application Number 0128163.3, filed on Nov. 23, 2001.

BACKGROUND OF THE INVENTION

The present invention relates to nets, for example cargo nets to restrain the movement of cargo in the fuselage of aircraft.

It is well known to use nets as barriers on aircraft to restrain cargo that would otherwise move and penetrate into areas occupied by aircraft personnel, critical equipment and systems, access door or emergency access routes during the acceleration and deceleration of the aircraft during take-off and landing and also during the extreme deceleration of the aircraft during emergency landing.

Conventionally, such nets comprise a network of textile straps to which securing means are fitted, e.g. shackles, quick release fittings, snap latches, single and double stud floor fittings to connect the net to the aircraft structure.

The success of the net to act as a barrier to the moving cargo relies on the net forming a profile when loaded that does not encroach into the areas it is intended to protect, whilst safely distributing the resulting tensile load into the aircraft structure.

In conventional textile nets, the straps are stitched at their intersections which helps to maintain the shape of the net and also ensures that the strap lengths between intersections are approximately equal. This means that when the load is applied to the net the load distribution throughout the net should be as designed. However, manufacturing tolerances used in the construction of the net mean that it is impossible to make the individual lengths exactly equal. Nets made of a high elongation material are able to compensate for this. If a member of the net from one stitched intersection to the other is shorter than it should be, all that happens, is that it will experience a magnitude of load sooner than it should have, the material elongates, which causes the load to be shared to the other members in the net.

Such known nets suffer from disadvantages. The textile straps elongate under tensile load, which although in some cases can be an advantage in forming the desired profile when restraining the shifted cargo, in cases when the net is fitted in close proximity to the areas occupied by aircraft personnel, critical equipment and systems, or emergency access routes, the elongation of the net must be strictly limited. Limitation of the elongation of the net is currently achieved through the employment of multiple layers of textile straps. Multiple layers of textile straps increase the volume of the cargo net and, depending on the number of layers required, can prove very difficult to manufacture.

It would therefore be preferable to make nets out of materials having a much lower elongation, e.g. nets comprising metallic fibre cables or plastics fibre materials. Nets made of plastics fibre materials (such as aramid fibre materials, e.g. KEVLAR®) would be highly desirable since such nets would have a much lighter weight, a much higher strength to weight ratio and prevent cargo from penetrating into unwanted areas.

A net constructed of low elongation material in the conventional manner with stitched intersections would experience a number of problems. For a low elongation material net to balance out as described before, the accuracy of the net manufacturer would need to be much higher. If a member of the net from one stitched intersection to the other was shorter than it should be then it would experience a magnitude of load sooner than it should have but, because of the low elongation properties of the material it would not elongate sufficiently to share the load to the other members of the net and consequently it would experience a larger magnitude of load for a longer period of time thus making that member of the net more susceptible to breakage.

The manufacturing tolerances used for both high and low elongation material are identical and it is not practical to have increased accuracy for low elongation materials and hence not possible to compensate for low elongation material in the manner described for high elongation materials.

SUMMARY OF THE INVENTION

According to the present invention there is provided a net comprising a combination of a plurality of lengths of a first material with a plurality of lengths of a second material having a relatively lower elongation than that of the first material in which at least some of the lengths of first material are transverse to at least some of the lengths of second material.

It is preferable that at least some of the lengths of a first material are transverse to each other and more preferable that the lengths of the first material are transverse to each other at substantially right angles.

It is preferred that the net is in the form of a network of horizontal and vertical lengths but it is also possible to have a net which is in a "spider web" configuration, that is a plurality of concentric lengths intersected by a plurality of radial lengths.

It is preferred that at least some of the regions at which the lengths of first material cross are stitched together to help the net maintain its shape in use. A variety of stitching patterns as known in the art may be used to secure the lengths.

Securing means may be fitted to each end of the lengths of material in order that the net may be attached to another device or structure. The securing means may comprise a number of different devices such as shackles, quick release fittings, snap latches and single or double stud floor fittings. Both the first and the second lengths of material may be provided with one of the above securing means.

It is preferred that each of the lengths of second material is substantially coextensive with a corresponding one of the lengths of first material. When this is the case it is preferred that the securing means for the lengths of second material are common to the securing means of the corresponding lengths of first material. At least some of the lengths of second material may be transverse to each other. When this is the case it is preferred that the lengths are transverse to one another at substantially right angles.

A net provided with securing means as described may be installed across an internal space to act as a barrier. In this case the net may act as a barrier to restrain the unwanted movement of cargo when it is transported in the fuselage of aircraft.

Additionally, it is preferred that the lengths of second material comprise metallic fibre cables or plastics fibre cables. More preferably the lengths of second material comprise aramid fibre cables, e.g. KEVLAR®. Such a net would have the advantage of being strong, lightweight and having a low elongation under tensile loading when compared to conventional textile nets.

The net may be provided with a number of bindings around some, but not necessarily all, of the regions at which the lengths cross. These bindings may be in the form of textile loops and will ensure that the lengths of material are held in position at the region in which they cross. The bindings are formed around the crossing regions but are not physically attached to either the horizontal or vertical lengths. The bindings allow a degree of freedom of movement for the lengths whilst helping to maintain the overall shape of the net and ensuring that the lengths of second material, which are only attached at each end, are held in place.

BRIEF DESCRIPTION OF THE DRAWINGS

For a better understanding of the invention, reference will now be made to the accompanying drawings showing, solely by way of example, one embodiment of the present invention, in which:

FIG. 1 is a view from one side of one embodiment of a net according to the present invention;

FIG. 2 is a view from the other side of the net shown in FIG. 1;

FIGS. 3a and 3b show front and back views of one kind of binding loop used in the net;

FIGS. 4a and 4b show front and back views of a second kind of binding loop used in the net;

FIGS. 5a and 5b show front and back views of a third kind of binding loop used in the net;

FIG. 6 is an illustration of how one of the lengths of low elongation material is provided in the net; and FIG. 7 is a section along A—A of the length shown in FIG. 6.

DETAILED DESCRIPTION OF THE INVENTION

The embodiment to be described is a cargo net 1 for restraining the movement of cargo in the fuselage of an aircraft, FIG. 1 being a view looking aft in the installed position of the net 1 and FIG. 2 being a view looking forward in the installed position of the net 1.

The net 1 comprises a plurality of horizontal lengths 2 of a first material and a plurality of vertical lengths 3 of the first material which are transverse to one another at substantially right angles. The lengths are stitched together at each of the regions 10 at which they cross using a conventional stitching pattern (not shown) such that the net comprises a plurality of sections between the stitched intersections each of a substantially similar length. Each of the horizontal lengths is provided with a shackle 7 at each end which provides a securing means for fixing the net in position, for example to act as an internal barrier across the fuselage of an aircraft. Some of the securing means down a portion of one side of the net are provided with quick release fittings 8 such that this part of the net may be easily detached. The vertical lengths are provided with a smaller shackle 9 at each end since the side walls of the fuselage are able to withstand a larger force.

In addition to the network of lengths 2, 3 of first material the net is also provided with a plurality of lengths of a second material (not shown) which has a lower elongation than that of the first material. These lengths run in a horizontal direction and are substantially coextensive with a corresponding length of first material and are attached to the same securing means as the corresponding length of first material. The securing means are the only points of attachment for the lengths of second material as they are not stitched at the crossing regions 10.

To ensure that the lengths of second material remain in position, substantially coextensive with a length of first material, a plurality of binding loops 4, 5, 6 of different kinds are provided which fit around the stitched crossing regions 10 of the first material. The lengths of second material pass through the binding loops 4, 5, 6. The binding loops 4, 5, 6 prevent the length of second material from moving in the vertical direction but allow a certain degree of freedom for the length to move in the horizontal direction.

FIGS. 3a and 3b show front and back views of one kind of binding loop 4 used in the net. This form of the binding loop is provided at the majority of the regions 10 where the horizontal lengths 2 and vertical lengths 3 of first material cross. The binding loop 4 is formed from a single length of material which is looped around the vertical length of first material at the crossing region 10 in a figure of eight loop and stitched using stitching pattern 13. The length 11 of lower elongation second material, which is covered with a sleeve 12 of textile material (such as polyester) in order to protect it, passes through the binding loop 4 in the horizontal direction. The binding loop 4 restrains movement of the length 11 of lower elongation material in the vertical direction but also allows the length 11 of lower elongation material the freedom to slide through the loop 4 in the horizontal direction.

FIGS. 4a and 4b show front and back views of a second kind of binding, loops 5a and 5b, used in the net. In order to provide extra support, loop 5a is provided over the top of loop 5b. The loops 5a and 5b have the same basic construction features as the loop in FIG. 3 but are slightly larger in order to accommodate a different stitching pattern 15. The loops are provided at the outermost crossing regions 10 and the stitching pattern 15 gives the extra strength which is required at these points.

FIGS. 5a and 5b show front and back views of a third kind of binding loop 6 used in the net. The binding loop 6 is formed from a single length of material which is looped around the horizontal length of first material at the crossing region 10 in a figure of eight loop and stitched using the stitching pattern 16. The material loop has a different orientation from the loops in FIGS. 3 and 4 such that the figure of eight loop is provided around the horizontal length of first material at the crossing region 10. This loop occurs only at the top and bottom of the centre vertical length. This is because this length does not have securing means attached to the ends.

FIG. 6 is an illustration of how one of the lengths 11 of lower elongation material is provided in the net. The cut away portions show the length 11 of lower elongation material housed in a protective sleeve 12. In this embodiment the lower elongation material comprises plastics fibre material such as KEVLAR®. The plastics fibre is in the form of a single length of material which is wound around each of the securing means 7 a plurality of times to give a length 11 of lower elongation material which is of the required length.

FIG. 7 shows a section along A—A of the length 11 of lower elongation material in FIG. 6. The length 11 of lower elongation material is wound around each of the fixing means 7 a plurality of times and is encased in a protective sleeve 12.

Although the length 11 of lower elongation material is only provided in the horizontal direction in the described embodiment it is foreseeable that a net could be made having the length 11 of lower elongation material in the vertical direction or in a combination of horizontal and vertical directions.

It is envisaged that a net as described above would go at least some way towards overcoming the disadvantages of conventional nets, or at least to provide an acceptable alternative system for reasonably ensuring the net distributes the resulting tensile load safely into the aircraft structure and does not penetrate into areas occupied by aircraft personnel, critical equipment and systems, or emergency access routes during the acceleration and deceleration of the aircraft during take-off and landing and also during the extreme deceleration of the aircraft during emergency landing.

Whilst the low elongation material takes the majority of the load that is applied to the net, the traditional high elongation material does take a portion of the load.

The invention claimed is:

1. A net comprising a combination of a plurality of lengths of a first material with a plurality of lengths of a second material having a relatively lower elongation than that of the first material, the lengths of the first material being arranged in the form of an interconnected network and being stitched together at the points of intersection of said lengths, characterised in that each of the lengths of the second material is substantially coextensive with a corresponding one of the lengths of the first material and have freedom of movement along substantially the whole of their lengths.

2. A net according to claim 1, wherein at least some of the lengths of the first material are transverse to each other.

3. A net according to claim 2, wherein the lengths of the first material are transverse to each other substantially at right angles.

4. A net according to claim 1, wherein the lengths of the first material are provided with fixing means at each end.

5. A net according to claim 1, wherein the lengths of the second material are provided with fixing means at each end.

6. A net according to claim 5, wherein the fixing means of the lengths of the second material are common to a fixing means of the corresponding lengths of the first material.

7. A net according to claim 4, wherein the fixing means provide a means of attachment for installing the net across an internal space to act as a barrier.

8. A net according to claim 4, wherein at least some of the fixing means are quick-release fixings.

9. A net according to claim 1, wherein at least some of the points of intersection between the lengths of the first material are provided with bindings for holding the lengths of the second material in position.

10. A net according to claim 9, wherein each of the bindings comprises at least one length of material looped around the point of intersection.

11. A net according to claim 1, wherein the second material comprises metallic cables or plastics fibre cables.

* * * * *